No. 674,221. Patented May 14, 1901.
C. B. SEATON.
VEHICLE AXLE NUT.
(Application filed Mar. 6, 1901.)

(No Model.)

Witnesses:
Franck L. Ourand.
F. G. Radelfinger.

Inventor:
Cyrillus B. Seaton,
By Louis Bagger & Co,
Attorneys.

UNITED STATES PATENT OFFICE.

CYRILLUS B. SEATON, OF AURORA, ILLINOIS, ASSIGNOR OF ONE-HALF TO JOHN C. SEATON, OF SOMONAUK, ILLINOIS.

VEHICLE-AXLE NUT.

SPECIFICATION forming part of Letters Patent No. 674,221, dated May 14, 1901.

Application filed March 6, 1901. Serial No. 50,018. (No model.)

*To all whom it may concern:*

Be it known that I, CYRILLUS B. SEATON, a citizen of the United States, residing at Aurora, in the county of Kane and State of Illinois, have invented new and useful Improvements in Vehicle-Axle Nuts, of which the following is a specification.

My invention relates to vehicle-axle nuts; and the object of the same is to construct a nut which will be provided with means for taking up the wear occasioned by the turning of the hub, which means shall be simple in construction and efficient in operation. With this object in view I have designed the simple and novel construction fully described in this specification and claimed, and illustrated in the accompanying drawings, forming a part thereof, in which—

Figure 1:
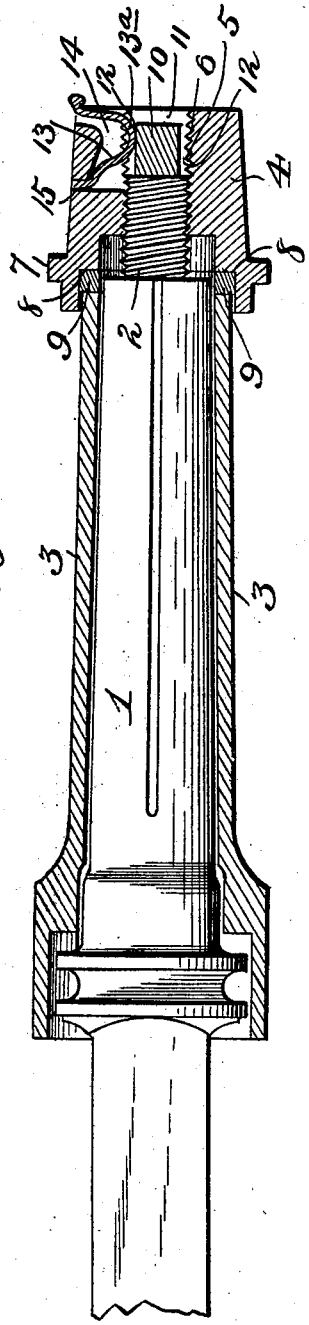
Figure 2:
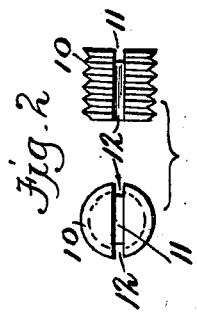
Figure 3:
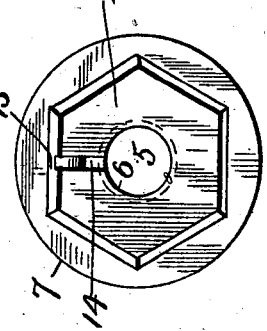

Figure 1 is a vertical longitudinal section through a spindle fitted with my improved nut, together with a portion of the box. Fig. 2 is a side and end view of the take-up screw. Fig. 3 is an end view of the nut.

Like numerals of reference designate like parts in the different views of the drawings.

The numeral 1 designates a vehicle-spindle which is provided with a screw-tenon 2 integral therewith. The box 3 of a hub fits over the spindle 1. A hexagonal nut 4, longitudinally traversed by an aperture 5, having screw-threads 6, is fitted on the screw-tenon 2. The nut 4 has a rim 7 and shoulder 8 on its inner face, which retain a washer 9. This washer fits against the end of the box 3. Mounted in the outer end of the aperture 5 and fitting the screw-threads 6 therein is a take-up screw 10. This take-up screw is grooved diametrically at 11 to accommodate a screw-driver and longitudinally grooved at 12 to adapt it to be engaged by a curved spring 13. To accommodate the spring 13, the nut 4 is grooved interiorly at 14 and apertured at 15. The groove 14 is rounded out to conform with the shape of the curved spring 13, which is inserted therein with its inner end projecting through the aperture 15 and riveted. The bend 13ª of the spring 13 extends down far enough to engage either of the grooves 12 and hold the take-up screw 10 from turning.

In operation the nut 4 is first put on the tenon 2 and screwed up as tight as desired, the take-up screw 10 put in the spring 13 raised, and the take-up screw 10 screwed up by means of a screw-driver until it abuts the end of the tenon 2. The spring 13 is then released and set to engage the nearest one of the grooves 12. The take-up screw 10 after being set in the manner described is never disturbed until the washer 9 or box 3 becomes worn, when it is withdrawn a half-turn or more to compensate for wear.

It will be noted that my device is simple and is provided with an efficient lock which obviates all danger of loosening of the parts.

Having thus described my invention, what I claim as new, and wish to secure by Letters Patent, is—

In a vehicle, the combination, with a spindle provided with a screw-tenon, of a nut fitting said tenon, and a take-up screw mounted in the outer end of said nut, said take-up screw being longitudinally grooved and a curved spring seated in a groove in said nut and located to engage the said slots in said take-up screw, substantially as described.

In testimony whereof I have hereunto set my hand in presence of two subscribing witnesses.

CYRILLUS B. SEATON.

Witnesses:
 CHAS. A. FLYNN,
 HULLIS BLACKMAN.